US011481511B2

(12) United States Patent
Amar

(10) Patent No.: US 11,481,511 B2
(45) Date of Patent: Oct. 25, 2022

(54) SECURE IDENTITY AND PROFILING SYSTEM

(71) Applicant: Visa International Service Association, San Francisco, CA (US)

(72) Inventor: Sumit Amar, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 217 days.

(21) Appl. No.: 16/759,831

(22) PCT Filed: Nov. 3, 2017

(86) PCT No.: PCT/US2017/059929
§ 371 (c)(1),
(2) Date: Apr. 28, 2020

(87) PCT Pub. No.: WO2019/089044
PCT Pub. Date: May 9, 2019

(65) Prior Publication Data
US 2020/0311299 A1 Oct. 1, 2020

(51) Int. Cl.
*H04L 29/06* (2006.01)
*G06F 21/62* (2013.01)
(Continued)

(52) U.S. Cl.
CPC ........ *G06F 21/6245* (2013.01); *H04L 9/0637* (2013.01); *H04L 9/3213* (2013.01);
(Continued)

(58) Field of Classification Search
CPC . G06F 21/6245; H04L 9/0637; H04L 9/3213; H04L 63/126; H04L 2209/38; H04L 2209/80
See application file for complete search history.

(56) References Cited

U.S. PATENT DOCUMENTS

2007/0061463 A1* 3/2007 Hiramatsu ............ G06F 13/385
709/226
2015/0161210 A1 6/2015 Cook et al.
(Continued)

FOREIGN PATENT DOCUMENTS

WO WO-0229516 A2 * 4/2002 ......... G06F 21/6209
WO WO-2022036182 A2 * 2/2022

OTHER PUBLICATIONS

Shafagh, Hossein, et al. "Towards blockchain-based auditable storage and sharing of IoT data." Proceedings of the 2017 on cloud computing security workshop. 2017. (Year: 2017).*
(Continued)

*Primary Examiner* — Shawnchoy Rahman
(74) *Attorney, Agent, or Firm* — Kilpatrick Townsend & Stockton LLP

(57) ABSTRACT

A system for storing and managing secure information is disclosed that includes a secure identity and profiling system, which serves as a middleman between a user and an entity requesting personally identifiable information (PII) from the user. The system collects the PII from the user and stores it securely, such as in an alternate blockchain in an encrypted form. The location of the that PII within the alternate blockchain may be indexed using smart contracts in a main blockchain that can only be read with an access token generated and supplied by the user's mobile device. When an entity requests PII from the user that has already been collected and securely stored, the user can provide permission to release that PII by providing the access token. The system will use the access token to locate where the PII is stored and release the PII to the requesting entity.

17 Claims, 5 Drawing Sheets

(51) Int. Cl.
*H04L 9/06* (2006.01)
*H04L 9/32* (2006.01)
*H04L 9/40* (2022.01)
*H04L 9/00* (2022.01)

(52) U.S. Cl.
CPC .............. *H04L 63/126* (2013.01); *H04L 9/50* (2022.05); *H04L 2209/80* (2013.01)

(56) References Cited

U.S. PATENT DOCUMENTS

| | | |
|---|---|---|
| 2017/0041296 A1 | 2/2017 | Ford et al. |
| 2017/0111175 A1 | 4/2017 | Oberhauser et al. |
| 2017/0155515 A1 | 6/2017 | Androulaki et al. |
| 2017/0230352 A1* | 8/2017 | Chen ................... H04L 63/0807 |
| 2017/0230353 A1 | 8/2017 | Kurian et al. |
| 2017/0243193 A1 | 8/2017 | Manian et al. |
| 2017/0310653 A1 | 10/2017 | Zhang |
| 2017/0358302 A1* | 12/2017 | Orr ......................... G06F 3/167 |
| 2018/0322473 A1* | 11/2018 | Castinado .............. G06Q 20/36 |
| 2018/0375849 A1* | 12/2018 | Koskimies ............ H04L 9/3234 |
| 2019/0013948 A1* | 1/2019 | Mercuri .................. G06F 9/451 |

OTHER PUBLICATIONS

"Survey on Blockchain Technologies and Related Services", Nomura Research Institute, Available Online at: https://www.meti.go.jp/english/press/2016/pdf/0531 01f.pdf, Mar. 2016, 77 pages.

Application No. EP17931022.2, Extended European Search Report, dated Sep. 28, 2020, 10 pages.

Application No. SG11202003937R, Written Opinion, dated Oct. 8, 2021, 7 pages.

PCT/US2017/059929, "International Search Report and Written Opinion", dated Jul. 17, 2018, 11 pages.

* cited by examiner

SECURE IDENTITY AND PROFILING SYSTEM

FIELD

Methods and systems disclosed herein relate generally to the secure storage, management, and retrieval of data. More specifically, the methods and systems disclosed herein are directed to systems for managing the storage of personally identifiable information (PII) by using blockchain technology to map and retrieve that information to distribute to requesting entities.

BACKGROUND

In today's technological environment, a user may interact with an entity (or more specifically, a computer system associated with an entity) that requests personally identifiable information (PII) associated with the user. For example, an entity may request certain key pieces of information from a user in order to carry out an exchange or transaction between the entity and the user. Such transactions can include the exchange of specific resources, goods, services, financial instruments, access (e.g., to a secure resource or area), and so forth.

In many cases, the user may be requested to provide PII such as the user's address, the user's social security number, and so forth. For example, the entity may be a financial entity such as a bank, and the transaction may be the user applying for a loan. In such an example, the user would be requested to provide PII that the bank may use to make a decision on the loan (e.g., by using that PII to look up the user's credit score).

Thus, a user conducting multiple transactions over time may be providing PII to multiple entities associated with those transactions. This may result in duplicated efforts in which the user is repeatedly providing the same PII to different entities. In order to prevent this from happening, a system can be implemented that stores PII associated with a user and enables the sharing of that PII across multiple entities.

For example, a user may initiate loan applications with a first bank and a second bank in order to cross-shop loan rates. A system that stores the user's PII (e.g., address, social security number, and so forth) could share that PII with both the first bank and the second bank, such that the user would not need to manually enter and provide the PII to both the first bank and the second bank.

However, such a system faces numerous challenges associated with data security. Different entities may require different subsets of a user's PII. Care must be taken to provide each entity with only the minimum amount of a user's PII necessary and to ensure that each entity is authorized to receive the user's PII. Furthermore, the PII for each user should be stored by the system in a secure manner that prevents or mitigates the release of PII in the event that the system is hacked.

BRIEF SUMMARY

In some embodiments of the present disclosure, systems and methods are contemplated for which an identity and profiling system receives a request from an entity computing system for a first set of information associated with a user. The identity and profiling system may send a request to a mobile device operated by the user for the first set of information associated with the user. The identity and profiling system may receive an access token from the mobile device and determine a key associated with the user, which is used to decrypt the access token in order to obtain a second set of information associated with the user. The identity and profiling system may determine from a main blockchain at least one storage location for a third set of information associated with the user, and then the identity and profiling system may locate the third set of information associated with the user in an offchain based on the at least one storage location. Once the third set of information associated with the user is located and retrieved, it can be sent to the entity computing system.

In some embodiments, the first set of information associated with the user may correspond to the set of a user's personally identifiable information (PII) that is being requested from the entity computing system. For example, in order to conduct a transaction or perform a function, the entity computing system may need the user's address and social security number. Thus, the first set of information in this example would be the user's address and social security number. In some embodiments, the second set of information associated with a user may correspond to the set of a user's PII that the user is permitting to be released to the requesting entity computing system. In general, the second set of information will be an indication of the PII permitted to be released rather than the actual underlying values for that PII. For instance, in the previous example, the user may provide permission to release their address but not their social security number. Thus, the second set of information in this example would be an indication of the user's address data field instead of the user's actual address. In some embodiments, the third set of information associated with the user may also correspond to the user's PII that the user is permitting to be released to the requesting entity computing system. However, the third set of information will generally be the actual underlying values for that PII (e.g., stored in the offchain). For instance, in the previous example, the third set of information would be the user's address.

In various embodiments, the offchain may be a decentralized data store or an alternate blockchain. In various embodiments, the at least one storage location for the third set of information associated with the user is indicated in a smart contract of the main blockchain. In various embodiments, the identity and profiling system may take steps to determine that a phone number for a mobile device associated with the user exists within the identity and profiling system.

In various embodiments, the identity and profiling system may take steps to determine that a phone number for a mobile device associated with the user does not exist within the identity and profiling system. Upon determining that the phone number for a mobile device associated with the user does not exist within the identity and profiling system, a request may be sent to the mobile device for the user to provide the first set of information associated with the user. In various embodiments, the identity and profiling system may assign a key associated with the user to the mobile device. In some embodiments, the key associated with the user may be a shared secret (e.g., a symmetric encryption key) or an IPS public key of an IPS public/private key pair used to decrypt transmissions from the mobile device. In some embodiments, the IPS public/private key pair may be specifically associated with the user, and one public/private key pair can be generated for each user of the IPS system. In such embodiments, the IPS public key of the IPS public/private key pair may not be generally available to the public or other users, but is only known to the specific user to which the public/private key pair was assigned. Following registration, the identity and profiling system may receive the first set of information associated with the user from the mobile device and store the first set of information associated with the user in the offchain. The identity and profiling system may store at least one storage location for the first set of information associated with the user in the main blockchain.

In some embodiments of the present disclosure, systems and methods are contemplated for which a mobile device receives a request from an identity and profiling system to provide a first set of information associated with a user of the mobile device to a requesting entity. The mobile device may generate a user interface allowing the user to grant permission to provide the first set of information associated with the user to the requesting entity. Once the user grants permission, the mobile device may generate a second set of information associated with the user (e.g., based on the granted permissions). The mobile device may retrieve a key associated with the user and generate an access token by encrypting the second set of information associated with the user using the key associated with the user. Finally, the mobile device may send the access token to the identity and profiling system.

In various embodiments, the second set of information associated with the user is an access control bitmap. In various embodiments, the mobile device includes a keystore manager for storing the key associated with the user. In various embodiments, the mobile device may take steps to determine, from the request, an entity identifier associated with the requesting entity. The entity identifier can be used by the mobile device to authenticate the requesting entity by verifying the entity identifier (e.g., with a certificate authority).

DETAILED DESCRIPTION

Introduction

Figure 1:
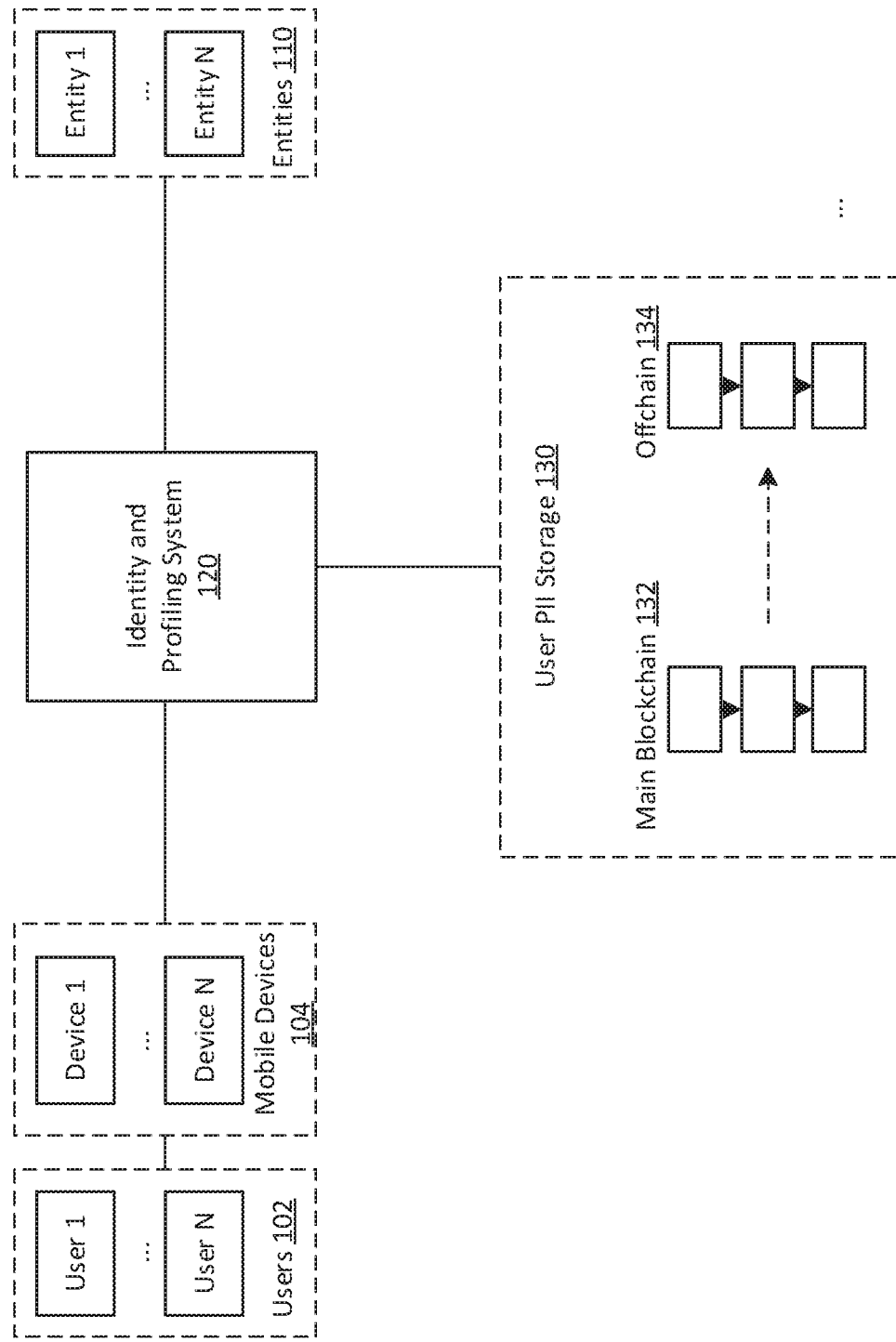
FIG. 1 illustrates a system diagram for storing and managing secure information that includes a secure identity and profiling system, in accordance with embodiments of the present disclosure.

Users frequently provide varying amounts of sensitive information, such as personally identifiable information (PII), to multiple different entities (e.g., for the purposes of conducting a transaction). It is inconvenient for a user to manually enter this requested information (e.g., via a user interface on a mobile device) each time.

In order to prevent a user having to manually enter that information each time, that user's information can be stored (e.g., by a system) and later retrieved when needed again.

However, an implementation that involves saving PII with at least one of the entities poses problems. In particular, the entities will not, by default, trust each other. This will prevent the sharing of the saved PII between entities unless the user is somehow able to provide explicit permission for the sharing to take place.

Furthermore, there are security issues associated with saving user PII at one entity (e.g., a centralized location) or even storing user PII data with multiple entities (e.g., at multiple different locations). In particular, any user PII stored with the entities will be susceptible to hacking and security breaches. In that scenario, the entities have ownership of user PII and the users are at the peril of those entities being hacked; if any of those entities are hacked, any user PII stored with those entities will be exposed and out in the wild. Furthermore, storing user PII at the entities could allow the entities to look up and access user data at any time, even if the user is unaware and has not given the entity permission to look up that information.

This disclosure is directed towards mitigating these problems by having user PII stored at a location (e.g., a centralized or decentralized data store) that is gated or facilitated by a neutral, third party. However, this third party does not actually have possession of the user PII—each user would continue to "own" any information associated with them. The third party only serves to pull relevant user PII from the data store and release that information to requesting entities upon receiving user permission. In other words, all of the user's PII becomes part of the user's profile and is hidden from all of the entities, but can also be made available to the entities based on need and the user's permission. For instance, an entity can request, and can be provided, access to retrieve some of a user's PII from a decentralized data store.

Furthermore, the user PII can also be stored using a data structure that prevents the information from being used to identify specific users even if the data store and/or the third party are hacked. The result is a system that allows a user conducting multiple transactions over time to easily and seamlessly provide the user's PII to multiple entities associated with those transactions. This prevents the user from having to manually enter and provide their PII to each entity, while also improving data security by reducing the chances that the user's PII will fall into the wrong hands.

Terms and Definitions

Prior to discussing the details of some embodiments of the present invention, description of some terms may be helpful in understanding the various embodiments.

A "transaction" may comprise any exchange or interaction between two or more users and/or entities. The transaction can include the exchange of resources, goods, services, financial instruments, access (e.g., to a secure resource or area), and so forth. In some embodiments, the transaction may require a user to provide certain personally identifiable information (PII) that is necessary for the transaction. For instance, one example of a transaction is a loan application (e.g., where a financial entity such as a bank is offering to provide a loan to a user, and the user is applying for the loan) which may require the user to provide certain PII necessary to establishing the loan (e.g., a bank account number for disbursing the loan amount to). Another example of a financial transaction could be a user applying for a credit card or bank account. An example of a non-financial transaction could be a user seeking healthcare treatment, which may require that the user provide certain PII (e.g., protected health information, or PHI) in order to receive treatment.

"Personally identifiable information (PII)" may refer to any data items associated with a user that can be used (e.g., by itself or in combination with other data items) in order to identify a specific user. Examples of PII include a user's address, a user's birthdate, a user's social security number, a user's bank account number, a user's bank account balance, a user's current salary, a user's property information, a user's outstanding loans, the user's driving history, and so forth.

A "user" may refer to any person that may participate as a party to a transaction. In some cases, the user may be in possession of a mobile device which can be used to communicate with the Identity and Profiling System in order to provide permission to release the user's PII to requesting entities. In some embodiments, individual users may be direct customers of financial services provided by financial entities. In some embodiments, individual users may be direct customers of healthcare services provided by healthcare entities.

An "entity" may refer to any counterparty to a user in a transaction. An entity may provide to the user resources, goods, services, financial instruments, access (e.g., to a secure resource or area), and so forth. The entity may include or be associated with a computing system that handles the transaction electronically. The entity may seek access to certain personally identifiable information (PII) or secure profile data of the user, which the user may consent to providing. Examples of entities include financial entities that users interact with to carry out financial operations, such as the opening of an account (e.g., bank account), applying for loans, updating of personal information, and so forth. Other examples of entities include insurance companies, as well as healthcare entities such as hospitals, healthcare providers, and so forth.

A "blockchain" may be a distributed database that is used to maintain a continuously growing list of records, called blocks. In some implementations, each block contains a timestamp and a link to a previous block. A blockchain is typically managed by a peer-to-peer network collectively adhering to a protocol for validating new blocks. Once recorded, the data in any given block cannot be altered retroactively without the alteration of all subsequent blocks and the collusion of the network. This allows the blockchain to serve as a data record between parties that is both verifiable and permanent. A blockchain platform utilizing smart contracts may be used with the Identity and Profiling Service (IPS) in order to store the location of secure information (user PII), which itself can be stored in off-chain storage (e.g., another blockchain or a secure distributed datastore). A blockchain may be spread out over a plurality of nodes (e.g., of a distributed computing system).

A "smart contract" may be a computer protocol intended to facilitate, verify, or enforce the negotiation or performance of a contract. It may include a technology feature of a blockchain that consists of local storage, code, and a virtual currency. The local storage of smart contracts can be used to store the location of user PII and secure profile information and retrieve that information based on an access token.

A "node" may refer to any suitable data computation device or devices, which may commonly include a processor and memory for running applications, such as a blockchain client. In some embodiments, a node may be tasked with updating and maintaining a blockchain.

An "Identity and Profiling Service (IPS)" may refer to a central hub of middleware stack that interfaces between individual users (e.g., their mobile devices) and entities, and also interacts with a permissioned blockchain platform that stores users' secure personal information. The IPS facilitates the management of secure identities and profile data for users by seeking out permission from a user to locate and retrieve their personal information to release to a requesting entity. In some cases, a user may be in possession of a mobile device which can be used to communicate with the IPS in order to provide permission to release the user's PII to requesting entities.

An "entity identifier" may to any suitable data that can be used to identify an entity. In some embodiments, an entity identifier may include a public key certificate that is used to identify/verify an entity. The entity identifier may be used as an input to constructing a secure access token.

An "access control bitmap" may refer to a digital object or file that provides a mapping indicating which data items of a user's stored PII to release to a requesting entity (e.g., the mapping can dictate the user's profile attributes IDs). For instance, when a user is providing PII directly to an entity, all of that information may be associated with a field/attribute name (e.g., "client name" for the user's legal name). These attribute names being requested by an entity may be sent to the user with the request, such that the user can see what kinds of information are being requested. Once the user grants permission to release that information, the attribute names can be converted into a bitmap. In some cases, the bitmap may have 128-bits which individually act as a switch. For instance, each bit can be set to '0' or '1', and if a bit is set to '1', the attribute associated with that bit is being requested from the user. It should be noted that the bitmap may be used as an input to constructing an access token.

An "access token" may include any suitable data that can be used to provide access to certain information. It may refer to a digital object, file, or token that is constructed using a combination of the user's private key certificate, the entity identifier, and the access control bitmap. For instance, the access control bitmap may be encrypted using a shared secret based off the user's private key and/or the entity identifier. For example, a shared secret may be an entity identifier encrypted by the user's private key. The shared secret may then be transferred to the IPS using a session key or a protocol such as a Diffie-Hellman protocol. In order to decrypt the access token, the IPS may use the shared secret. This token is passed between the user's device and the IPS. The access token may be used to indicate multiple things: (1) the user specifically granted permission to the data and the permission is not coming from someone else (since the shared secret is unique to the user and the entity and can be verified with a user's public key corresponding to the user's private key); and (2) only the requesting entity is going to be receiving the data and no one else (since nobody else would have the entity's identifier). The access token is constructed on the user's mobile device (e.g., client-side).

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "application" may be computer code or other data stored on a computer readable medium (e.g. memory element or secure element) that may be executable by a processor to complete a task.

FIGURES

FIG. 1 illustrates a system diagram for storing and managing secure information that includes a secure identity and profiling system, in accordance with embodiments of the present disclosure.

In various embodiments, there may be one or more users 102, including user 1 through user N. The users 102 may operate mobile devices 104 (e.g., smart phones), including device 1 through device N. Each user may have their own mobile device, through which they communicate with the Identity and Profiling System 120. Thus, the users 102 collectively operate the mobile devices 104 to communicate with the Identity and Profiling System 120.

In some embodiments, the Identity and Profiling System 120 may be in communication with one or more entities 110, including entity 1 through entity N. These various entities 110 may be counterparties to interactions or transactions with the users 102. For instance, user 1 may interact with entity 1, which requests certain information from user 1 in order to proceed with the interaction.

In some embodiments, the Identity and Profiling System 120 may serve as a communications middleman between the users 102 and the entities 110. For instance, if entity 1 requests certain information (e.g., personally identifiable information, or PII) from user 1 in order to proceed with the interaction, the Identity and Profiling System 120 will send that request to the mobile device (e.g., device 1) used by user 1.

In some embodiments, the Identity and Profiling System 120 may also serve to collect, store, and manage any PII from the users 102. For instance, if user 1 receives a request from entity 1 for certain information associated with user 1 that has not already been collected by the Identity and Profiling System 120, the Identity and Profiling System 120 may receive that information from user 1. The Identity and Profiling System 120 may then store user 1's PII in User PII Storage 130.

In some embodiments, the User PII Storage 130 can be a centralized or decentralized data store for storing users' PII. User PII can be catalogued within the User PII Storage 130 for later retrieval by the Identity and Profiling System 120. For example, if entity 1 requests certain information from user 1 for the first time, user 1 can provide that information to the Identity and Profiling System 120 to be stored in the User PII Storage 130. If at a later time, entity 2 requests that information from user 1, user 1 can provide the Identity and Profiling System 120 permission to retrieve that information from the User PII Storage 130 and release it to entity 2.

In some embodiments, the User PII Storage 130 can be implemented using a combination of a main blockchain 132 and offchain 134. In some embodiments, offchain 134 may refer to an alternative blockchain that branches off the main blockchain 132, while in other embodiments, offchain 134 may be any form of secure, decentralized data store (e.g., distributed over one or more nodes of a cloud computing cluster). In some embodiments, the Identity and Profiling System 120 may manage secure information (user PII) by storing it in the offchain 134. For instance, offchain 134 could be an alternate blockchain and a user's PII could be stored in various blocks of the offchain 134. The offchain 134 may store user PII without storing any information of which user the PII is associated with. Thus, a user's PII could be 'anonymized' by being broken up and stored in a distributed manner across the various blocks. This would result in, for example, one block containing only a user's current salary, which by itself would not be enough information to identify which user that data is associated with. In such embodiments, a transaction identifier or other data may be used to link different types of data spread across various blocks.

In some embodiments, the main blockchain 132 can be used to store the various locations of where a user's PII is stored in the offchain 134. In some embodiments, the main blockchain 132 may be implemented on a blockchain platform utilizing smart contracts and the location data for a user's PII can be stored on smart contracts in the main blockchain 132. In order for the Identity and Profiling System 120 to read a smart contract associated with a particular user, the Identity and Profiling System 120 may need some information, such as the access token, the access control bitmap, and/or the user's public key. With that information available, the Identity and Profiling System 120 may be able to read a smart contract to map out the locations for where the user's PII is stored. The Identity and Profiling System 120 may then retrieve the user's PII from those locations and release the PII to the requesting entity.

By storing user PII in the offchain 134 in an 'anonymized' manner (e.g., where all the locations of a user's PII is indexed using the main blockchain 132), an extra layer of security is added. In the event that the offchain 134 is hacked, the data within the offchain 134 cannot be associated with particular users. Additionally, in the event that the main blockchain 132 is hacked, the main blockchain 132 only contains the locations of a users PII and those locations can only be read with the user's private key in possession.

In summary, the Identity and Profiling System 120 can store user data in the offchain 134 (which can be a blockchain) and can also retrieve that stored user data from the offchain 134. The entities 110 themselves do not have direct access to the offchain 134 or even the main blockchain 132, which informs where user data is stored in the offchain 134. In order for the entities 110 to obtain user data, the Identity and Profiling System 120 must retrieve the requested user data from the offchain 134 and release it to the requesting entity.

As an example use case, one of the entities 110 could be a financial entity, such as a bank. If a user applies for a loan at the bank, the bank may request certain information associated with the user that is needed for making a loan decision. For instance, the bank may need to know information such as the user's address and bank account number to deposit the loan to. In addition, the bank may want to know the user's current salary and the user's total current debt in order to determine whether it is prudent to extend a loan to the user. However, the bank would not request this information from the user directly. Instead, the user may supply the bank with a phone number for their mobile device. The bank may send a request to the Identity and Profiling System 120, with the request indicating the user's phone number and all the different items of information being requested (these may be in the form of attribute IDs or field names, such as "salary", "total debt", and so forth). In some cases, the request may also include an entity identifier associated with the bank (e.g., the bank's public key).

The Identity and Profiling System 120 would receive that request from the bank. In some embodiments, the Identity and Profiling System 120 may authenticate the bank by verifying the entity identifier. For instance, the entity identifier can be sent to a certificate authority to verify (e.g., if the entity identifier is a public key). The Identity and Profiling System 120 may then check to see if the user's phone number exists in the records of the Identity and Profiling System 120 (e.g., if it exists in a data store). If the user's phone number exists in the records, that means the user has already signed up with the Identity and Profiling System 120 and the requested information has likely been collected and stored.

Alternatively, if the user's phone number does not exist in the records, that means the user has not signed up yet with the Identity and Profiling System 120. The Identity and Profiling System 120 may then contact the user via the phone number (e.g., by sending a text message to the number) that informs the user to download the mobile device application associated with the Identity and Profiling System 120 (in some cases, this application may be referred to as the "client system", which is discussed in more detail in regards to FIG. 2). The user would then instruct their mobile device to download and install the corresponding mobile device application. In some embodiments, the user may be assigned a user private key (which can be generated by the mobile device or provided by the Identity and Profiling System 120), and that user private key is sent to the application to be saved. In some embodiments, the user may be provided an IPS public key by the Identity and Profiling System 120, and the IPS public key can be saved by the application. Once installed, the mobile application would set up a user profile for the user to be associated with the mobile device phone number by having the user manually enter their personal information into the application. All of the user's PII would then be collected and stored by the Identity and Profiling System 120 in the offchain 134 with the location of that data indexed by smart contracts in the main blockchain 132. The Identity and Profiling System 120 may also provide the bank with the user data that it requested.

In the case that the user's phone number exists in the records, the Identity and Profiling System 120 may forward the request to the application on the user's mobile device. The application will inform the user that the bank is requesting their information and provide a list of all the information that the bank has requested. The user may give permission to release all of the requested information to the bank, or in some embodiments, the user may have the additional option to select which items to release to the bank (e.g., the user may choose to release their current salary but not their total debt).

Once the user has indicated which data items permitted to be released to the bank, the mobile application may generate an access control bitmap corresponding to those permissions. The access control bitmap may be used to generate an access token (such as by encrypting the bitmap with a shared secret, which may be based off a combination of the user's private key and/or the entity identifier, or by encrypting the bitmap with the IPS public key provided by the IPS), which is sent back to the Identity and Profiling System 120. The access control bitmap and the access token are described in further detail in regards to FIG. 2.

The Identity and Profiling System 120 may decrypt the access token to determine which data items the user has permitted to be released to the bank. Furthermore, using the access token the Identity and Profiling System 120 can locate and read the smart contract on the main blockchain 132 to determine where the user's PII is stored in the offchain 134. The Identity and Profiling System 120 can retrieve the requested data items from the offchain 134 and release those data items back to the bank. If the bank has requested certain data items that are not stored in the offchain 134 (this can be determined by checking what data is available in the smart contract), then the Identity and Profiling System 120 may prompt the user for the additional information (similar to the user sign-up process) and store that information in the offchain 134 after providing it to the bank.

Figure 2:
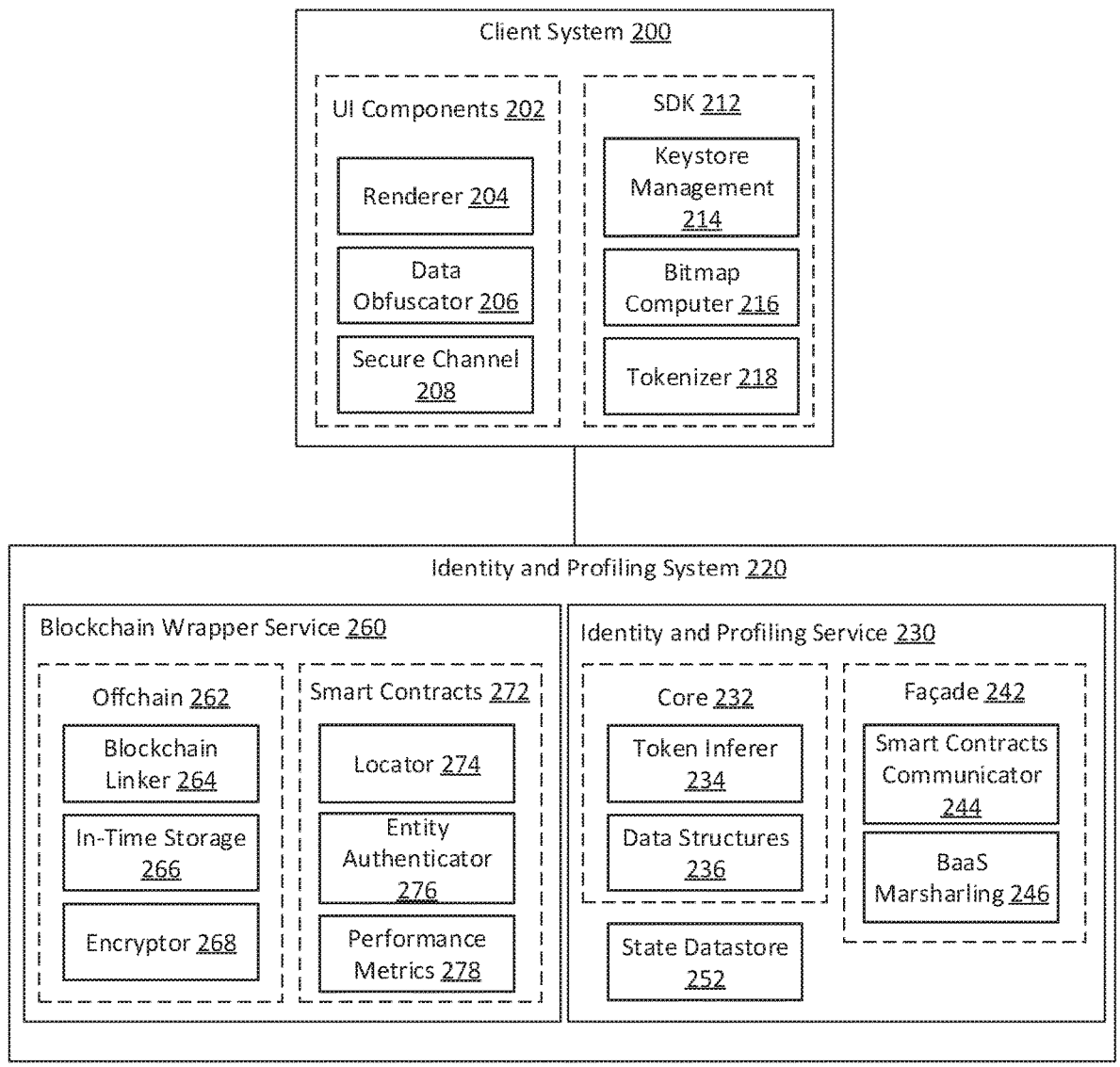
FIG. 2 illustrates system diagrams for a client system and an identity and profiling system, in accordance with embodiments of the present disclosure.

FIG. 2 illustrates system diagrams for a client system and an identity and profiling system, in accordance with embodiments of the present disclosure.

As shown in the figure, a Client System 200 (e.g., utilized by a user) may be configured to interact with an Identity and Profiling System 220 (e.g, the third party system for relaying requested user PII to various entities).

In some embodiments, the Client System 200 may be a hardware and/or software (e.g. application) package that is installed on a mobile device (e.g., a smartphone) of a user. For example, the Client System 200 may include a software application that contains all the various components of the Client System 200, and a user may install the application on their mobile device by navigating a browser on their mobile device to an 'App Store' to download the application.

In some embodiments, the client system 200 may include User Interface (UI) Components Features 202 and/or SDK Features 212. In some embodiments, the User Interface (UI) Components Features 202 may include a Renderer Module 204, a Data Obfuscator Module 206, and/or a Secure Channel Module 208. In some embodiments, the SDK Features 212 may include a Keystore Management Module 214, a Bitmap Computer Module 216, and/or a Tokenizer Module 218.

In some embodiments, the Renderer Module 204 may be the graphics engine that renders graphical user interfaces (GUI) on the user's mobile device that display queries or requests by an entity for the user's PII.

In some embodiments, the Data Obfuscator Module 206 may be configured to encrypt user data (e.g., the user's PII) before it is transmitted by the mobile device (e.g., through a wireless communications protocol). For example, when the user initially supplies their PII to the Identity and Profiling System 220 to be stored for later use, the Data Obfuscator Module 206 may encrypt that PII as an extra security precaution. This may help safeguard against man-in-the-middle attacks in which a malicious entity is seeking to intercept the user's PII. Any suitable encryption scheme may be used by the Data Obfuscator Module 206.

In some embodiments, the Secure Channel Module 208 may be a component that allows for a secure call or channel of communication to be established between the Client System 200 and the Identity and Profiling Service (IPS) 230 of the Identity and Profiling System 220. For example, in embodiments for which the Client System 200 includes a software application installed on a mobile device of a user, the Secure Channel Module 208 within that application may work to ensure that other applications (e.g., running in the background) on the mobile device cannot peer into any service requests or communications with the Identity and Profiling Service (IPS) 230. In some embodiments, the Secure Channel Module 208 may also safeguard against man-in-the-middle attacks by establishing a secure channel to prevent any communications with the Identity and Profiling Service (IPS) 230 from being intercepted. This secure channel may also serve to 'hide' data being sent from the user's mobile device to the entity (via the IPS).

In some embodiments, the Keystore Management Module 214 may be the user's private key store, or a secure location (such as a Trusted Execution Environment) in the user's mobile device that stores the user's private key certificate. This private key may be used as one of the three inputs for creating the access token that is needed to locate and access the user's stored PII.

In some embodiments, the Bitmap Computer Module 216 may be a component that is used to generate an access control bitmap that can be understood by the IPS (e.g., an IPS-understandable bitmap). The bitmap may serve to indicate which data items/fields of the user's PII or profile attributes are being requested by an entity. For example, a user's PII could include over a hundred data items (e.g., the user's address, data of birth, social security number, bank account number, and so forth). If the transaction with the entity only requires a subset of these data items (e.g., the entity is requesting only the user's address and date of birth, but not other items such as the user's social security number, bank account number, and so forth), then for security reasons care should be taken to ensure that the entity is being provided with only the necessary data items and not any 'extra' PII (e.g., the entity is being provided with only the user's address and date of birth, as requested). Thus, the bitmap serves as a mapping or indication of which data items are being permitted for release to the requesting entity. In some embodiments, bitmap can be thought of conceptually as a simple checklist that lists the available data fields. In some implementations, the bitmap may contain '0' or '1' values corresponding to each data field, with a '1' indicating that the user's PII corresponding to that data field is permitted for release to the requesting entity. In some cases, the bitmap may have 128-bits which individually act as a switch. For instance, each bit can be set to '0' or '1', and if a bit is set to '1', the attribute associated with that bit is being requested from the user.

In some embodiments, the Tokenizer Module 218 may be configured to generate access tokens. In some embodiments, the access token may be generated based on a combination of three inputs: the user's private key (e.g., stored by the Keystore Management Module 214), the entity's public key or any other suitable identifier for the entity (e.g., an entity identifier validated by a certificate authority), and the access control bitmap (e.g., generated by Bitmap Computer Module 216). In some embodiments, the Tokenizer Module 218 may further be configured to verify an entity (e.g., a financial entity such as a bank) using the entity's public key or the entity's identifier that is received by the Client System 200. The access token may be used to indicate multiple things: (1) the user specifically granted permission to the data and the permission is not coming from someone else (this can be inferred based on the encryption used, as well as the return of the entity identifier that was supplied to the mobile device); and (2) that the correct requesting entity is going to be receiving the data and no one else (this can be confirmed using the entity's identifier). In some embodiments, the Tokenizer Module 218 may generate the access token by taking the three inputs: the user's private key, the entity's public key, and the access control bitmap, and then binding all of that information together to create the access token (e.g., by encrypting the bitmap with a shared secret that is based off a combination of the user's private key and the entity's public key). Additional examples of techniques for generating the access token are disclosed herein.

In some embodiments, the access token may also define additional limitations on how the requesting entity can access the released information (e.g., a time duration for access). The user may be presented with the option in the mobile application to define limitations on access for the requesting entity, such as a time duration. The various access limitations for different entities associated with a particular user may be defined and managed within the smart contract of the main blockchain that is associated with that user. For instance, if a user only wants to give bank 'X' access to their PII for 48 hours, the user could specify that within the mobile application and the access token generated would contain that access limitation.

In summary, the user's mobile device may initially receive a request to provide user PII to the IPS. That request may be displayed via a graphical user interface rendered on a screen of the mobile device (e.g., by the Renderer Module 204). If the user accepts the request, the user may manually enter their PII (which can include numerous data items) directly into the user interface. The PII may then be encrypted (e.g., by the Data Obfuscator Module 206) and sent to the IPS (e.g., via a secure channel established by the Secure Channel Module 208) to be stored on the backend. When an entity requests certain items from the user's PII, that request may similarly be displayed via a graphical user interface rendered on a screen of the mobile device (e.g., by the Renderer Module 204). In some cases, the mobile device may receive the entity's identifier with the request, which can be used to authenticate the requesting entity (e.g., by verifying the identifier with a certificate authority). If the user accepts the request, then an access control bitmap may be generated (e.g., by the Bitmap Computer Module 216) that indicates which items of the user's PII are permitted to be released to that entity. The bitmap can be used, along with the user's private key and the entity's identifier, to generate an access token (e.g., by the Tokenizer Module 218) on the client-side. Once the access token is created, a secure connection is initiated with the IPS and the access token is sent back to the IPS. The IPS can decrypt and read the bitmap, which can be used to determine what data items are being released, as well as to locate and provide the requested PII for the user to the requesting entity.

In some embodiments, the Identity and Profiling System 220 may include an Identity and Profiling Service (IPS) 230 and/or a Blockchain Wrapper Service 260.

In some embodiments, the Identity and Profiling Service 230 may utilize REST/Socket interfaces and may include Core Features 232, Façade Features 242, and/or a State Datastore 252. In some embodiments, the Core Features 232 may include a Token Inferer/Parser Module 234 and/or a Data Structures Module 236. In some embodiments, the Façade Features 242 may include a Smart Contracts Communication Module 244 and/or a BaaS Marshaling Module 246.

In some embodiments, the Token Inferer/Parser Module 234 may be configured to receive and parse any access tokens received from the user's mobile device. As previously mentioned, the access token underscores a user's intent to share certain attributes or data items within their PII to the requesting entity. In some embodiments, the Token Inferer/Parser Module 234 component interacts with underlying blockchain services to source or store user PII. In some embodiments, the Token Inferer/Parser Module 234 may know the specific decryption mechanism needed to decode the access token. The Token Inferer/Parser Module 234 may decrypt the access token based on the appropriate decryption mechanism for the implementation. In some embodiments for example, the Token Inferer/Parser Module 234 may decrypt the access token using a shared secret (e.g., based on the user's private key and the entity's public key) and look at the access control bitmap supplied by the Client System 200 in order to determine the attributes that the user has provided permission to be read. Alternatively, as another example, the Token Inferer/Parser Module 234 may decrypt the access token using the IPS private key (if the access token was encrypted using the IPS public key provided to the mobile device) in order to look at the access control bitmap supplied by the Client System 200 and determine the attributes that the user has provided permission to be read.

In some embodiments, the Data Structures Module 236 may be configured to define how the user's PII is stored and structured on the backend. In some embodiments, the Data Structures Module 236 may include a set of classes that define data structures associated with a user, an entity, and any other downstream systems.

In some embodiments, the Smart Contracts Communication Module 244 may serve as a façade that takes care of managing connections with Blockchain services (e.g., if Blockchain technology is used to implement the storage of user PII). This component may be configured to translate hardware level language to a language that is compatible with smart contractors. In other words, this component may be a translator that takes an object and converts it into a smart contract.

In some embodiments, the BaaS Marshaling Module 246 may be configured to translate data structures between the IPS 230 and the Blockchain Wrapper Service 260. In some embodiments, the BaaS Marshaling Module 246 may be configured to transform data (e.g., user PII) to be sent to the requesting entity in the form of a callback service after that data has been located for the user in the offchain. The callback service may output the data to the requesting entity so that the entity can proceed to carry out the interaction with the user. Sending the data to the requesting entity in the form of a callback service may only take a few seconds and can be implemented using an asynchronous API call.

In some embodiments, the State Datastore 252 may be a local state database that stores service call state for various users without storing any PII associated with those users. For example, in some embodiments, the State Datastore 252 may store phone numbers associated with the mobile device of various users. If a phone number of a user's mobile device is stored within the State Datastore 252, that may mean that a profile exists for the user and the user's PII has been collected and stored. Otherwise, if a phone number of a user's mobile device does not exist within the State Datastore 252, then the user's profile has to be created and the user's PII has to be collected for storage. Thus, the IPS 230 may be configured to check if a user exists within the system or not by checking for a phone number of a mobile device associated with the user.

In some embodiments, the Blockchain Wrapper Service 260 may include Offchain Features 262 and/or Smart Contracts Features 272. In some embodiments, the the Offchain Features 262 may include a Blockchain Linker Module 264, an In-Time Storage Module 266, and/or an Encryptor Module 268. In some embodiments, the the Smart Contracts Features 272 may include a Locator Module 274, an Entity Authenticator Module 276, and/or a Performance Metrics Module 278.

In some embodiments, the Blockchain Linker Module 264 may be configured to create a link, via a smart contract, between each user's profile state and that user's PII stored on a separate blockchain. The separate blockchain may store the user's anonymized PII data in the form of transactions.

In some embodiments, the In-Time Storage Module 266 may be a component that allows retrieving user data in multiple parts from a point-in-time. The user might have stored different attributes at different times via different entities. Over time, data for an attribute may change and an entity's access to that attribute may change or expire. For example, a user's address may change over time as the user moves and the In-Time Storage Module 266 may be configured to allow the retrieval of the user's address at different points in time. For this kind of dynamic data, the In-Time Storage Module 266 may be configured to manage how long that data will be available to each entity. For example, in one implementation, for each PII data item of a user there may an access timer for each entity. This access timer may be an event-based timer (e.g., 'X' entity's access to this particular data item is going to expire in 5 days). In some embodiments, only one access timer may be triggered at a time, even if all the different attributes have different time settings. However, it should be noted that not all of a user's PII will be dynamic in nature. For instance, a user's social security number will not change over time, and thus there is no need for retrieving a user's social security number at different points in time.

In some embodiments, the Encryptor Module 266 may be configured to encrypt a user's PII before storing it (e.g., in the offchain, which can be a decentralized data store or a separate blockchain altogether). This encryption may provide an extra layer of security on the stored data fields. Thus, if someone hacked the offchain, they would be presented with encrypted data that would have to first be decrypted in order to make sense out of it. In some embodiments, the Encryptor Module 266 may encrypt a user's PII using the IPS public key. In some embodiments, the Encryptor Module 266 may encrypt a user's PII using the user's public key. Thus, all of data in the offchain (for all the different users) may be encrypted using varying user public keys. In order to decrypt data associated with a particular user, that user's private key would be needed. Thus, someone hacking the offchain would further need the IPS private key in order to decrypt and make sense of any data associated with that user.

In some embodiments, the Locator Module 274 may serve as a smart contract locator that is used to look up the appropriate smart contract associated with a user's PII, based on user and entity parameters. Locating the smart contract can be the first step to write, retrieve, or update the user's PII, since in some embodiments, the location of user PII and any access restrictions associated with that PII may be stored on smart contracts of a main blockchain. For instance, a smart contract may identify where certain data items for a user are stored (e.g., at an off-chain location) and any authorization (e.g., which entities have access) to those data items. The Locator Module 274 may also be configured to interpret the appropriate smart contract, allowing the Locator Module 274 to locate where the requested data items are actually stored based on what the data items are (e.g., the bitmap) and who the user is (e.g., based on the phone number associated with the user's mobile device).

In some embodiments, locating the appropriate smart contract associated with a user may involve information contained within the access token. In some embodiments, reading the information contained within the smart contract associated with a user may involve decryption based on keys associated with the access token (e.g., a shared secret that is based on the user's private key). Thus, it may not be possible for an entity to directly go to the smart contract associated with a user to attempt to locate the user's PII in the offchain without having possession of both the access token and any information needed to decode the access token.

In some embodiments, the Entity Authenticator Module 276 may be configured to authenticate entities submitting requests for a user's PII. As previously mentioned, each entity may be assigned and associated with an entity identifier. In some embodiments, the entity identifier may be a public key certificate assigned to the entity during onboarding. The Entity Authenticator Module 276 may serve to verify this public key certificate against a certificate authority in order to authenticate the entity. Thus, the Entity Authenticator Module 276 may serve to prevents rogue entities from obtaining access to user data.

In some embodiments, the Performance Metrics Module 278 may be configured to record in detail (sans any user PII data) any transaction times, transaction paths, success/error rates, and other metrics associated with storing, retrieving, and relaying user PII. The Performance Metrics Module 278 may be configured to determine how much time it takes to execute certain steps in the data relaying process and compile all of the metrics to identify areas for improvement.

Figure 3:
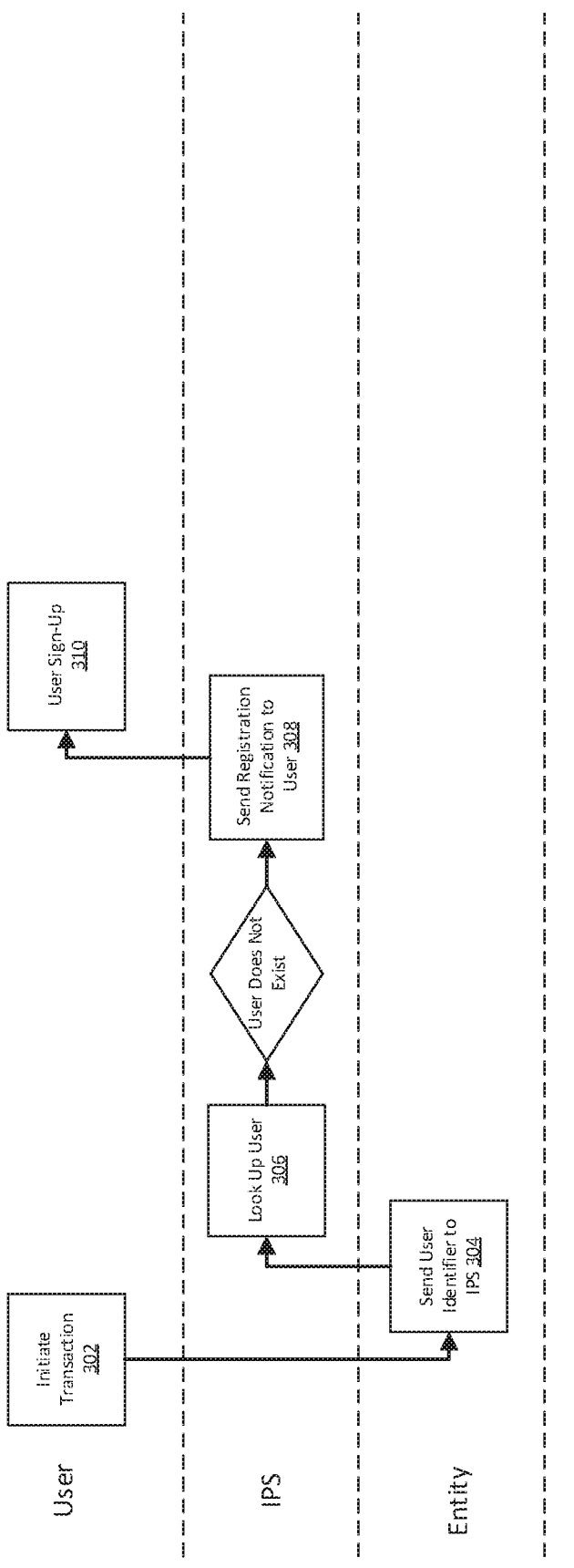
FIG. 3 illustrates a flowchart for registering a user with the identity and profiling system, in accordance with embodiments of the present disclosure.

FIG. 3 illustrates a flowchart for registering a user with the identity and profiling System, in accordance with embodiments of the present disclosure.

At block 302, a user may initiate a transaction or interaction with an entity. In some embodiments, the user may do this via their mobile device, such as by directing a browser on their mobile device to a webpage of the entity and selecting an option on the webpage associated with the transaction. In some embodiments, the user may initiate the transaction in person. For example, if the entity is a bank, the user may be able to show up at a branch office of the bank to apply for a loan.

At block 304, the entity may send a user identifier to the IPS. The user may supply their user identifier to the entity during the initiation of the transaction, or in some cases, the entity may know the user identifier in advance. In some embodiments, the user identifier may be a phone number of a mobile device associated with the user.

At block 306, the IPS may take the received user identifier and use it to look up whether the user's profile exists for the IPS. For instance, the IPS may have a data store (such as a state data store) that contains the user identifiers associated with users that have registered with the IPS. This data store would not contain any other user PII, which would be stored offchain. This data store may be used for user registration checks. In some embodiments, this data store may also list the available attribute IDs or fields of a user's available PII without providing the actual values for that PII. For instance, the data store may indicate that the PII collected for user 'X' includes the user's address, social security number, and current salary without specifying what each of those items actually is.

At block 308, the IPS may send a registration notification to the user if the IPS determines that the user's profile does not exist and the user has not registered with the IPS. For instance, if the user identifier is the phone number of a mobile device associated with the user, the IPS may check a data store to determine that the phone number is not stored in the data store. The IPS may then send a text message to that phone number informing the user that they need to register. The text message may include a link that will bring the mobile device's browser to a webpage (or page in an mobile application store) that will provide a mobile application (e.g., the client system 200) to be downloaded and installed.

At block 310, the user may download and install the mobile application on their mobile device. The application will walk the user through the sign-up process, after which the user's identifier (e.g., their phone number) is saved by the IPS to track that the user has signed up. In some embodiments, the sign-up process may involve the user manually inputting and providing some PII via the mobile application that will be received by the IPS and saved (e.g., into the offchain, along similar steps as blocks 416, 418, 420, and 422 shown in FIG. 4). Upon successful completion of the sign-up process, the IPS may generate a user private key for the user and assign it to the user. This may entail the user's mobile device saving the private key for the user (e.g., in a keystore on the mobile device) for future use. The IPS will not store the user private key, but in some embodiments, the IPS may keep a hash of the user private key which may be used to generate a shared secret for decrypting transmissions from the mobile device. In some embodiments, the user's mobile device may generate the user's private key on its own rather than receiving it from the IPS. In other embodiments, the IPS may have an IPS public/private key pair, and the IPS public key can be sent to the mobile device to store and use for encryption purposes. The IPS can then use the IPS private key to decrypt any data sent from the mobile device that has been encrypted with the IPS public key.

Figure 4:
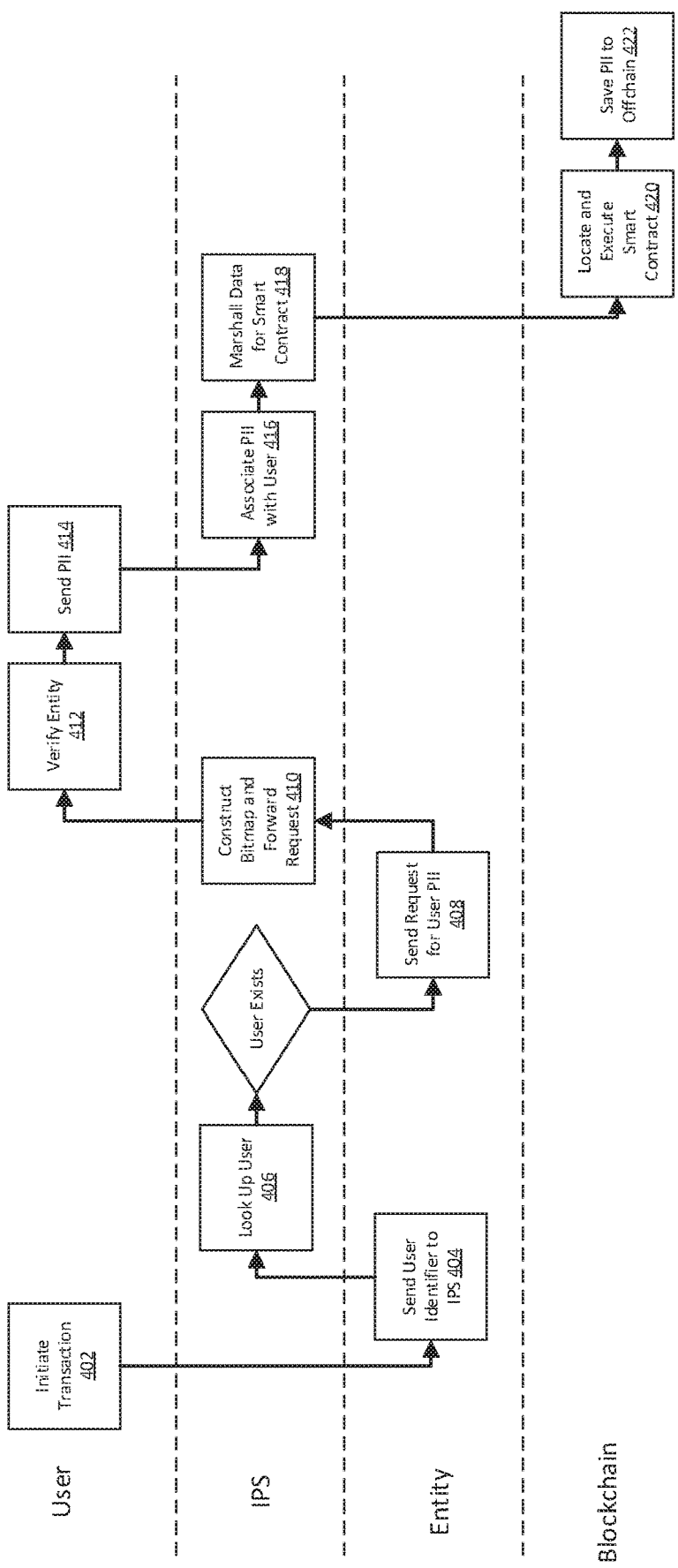
FIG. 4 illustrates a flowchart for collecting PII from a user with the identity and profiling system, in accordance with embodiments of the present disclosure.

FIG. 4 illustrates a flowchart for collecting PII from a user with the identity and profiling system, in accordance with embodiments of the present disclosure.

As shown in the figure, blocks 402, 404, and 406 may be similar to blocks 302, 304, and 306 in FIG. 3. FIG. 4 predominantly highlights a user being requested to provide PII for storage. In some embodiments, the access controls (e.g., time limits and other access limitations) are established during this process and they may be written into the smart contract.

At block 402, a user may initiate a transaction or interaction with an entity. In some embodiments, the user may do this via their mobile device, such as by directing a browser on their mobile device to a webpage of the entity and selecting an option on the webpage associated with the transaction. In some embodiments, the user may initiate the transaction in person. For example, if the entity is a bank, the user may be able to show up at a branch office of the bank to apply for a loan.

At block 404, the entity may send a user identifier to the IPS. The user may supply their user identifier to the entity during the initiation of the transaction, or in some cases, the entity may know the user identifier in advance. In some embodiments, the user identifier may be a phone number of a mobile device associated with the user.

At block 406, the IPS may take the received user identifier and use it to look up whether the user's profile exists for the IPS. For instance, the IPS may have a data store (such as a state data store) that contains the user identifiers associated with users that have registered with the IPS. This data store would not contain any other user PII, which would be stored offchain. This data store may be used for user registration checks. In some embodiments, this data store may also list the available attribute IDs or fields of a user's available PII without providing the actual values for that PII. For instance, the data store may indicate that the PII collected for user 'X' includes the user's address, social security number, and current salary without specifying what each of those items actually is. If the IPS determines that the user's profile exists (e.g., the user identifier is present in the system), the IPS may bypass the registration process shown in FIG. 3 and notify the entity.

At block 408, the entity may send a request for user PII to the IPS. The user PII requested may be specific to the transaction. For instance, if the user is applying for a loan with a financial entity, the financial entity may need to know certain information such as the user's bank account number to deposit the loan to, as well as the user's current salary and the user's total current debt in order to determine whether it is prudent to extend a loan to the user. The request may indicate the different items of information being requested for the user (these may be in the form of attribute IDs or field names, such as "salary", "total debt", and so forth). In some cases, the request may also include an entity identifier associated with the bank (e.g., the bank's public key).

At block 410, the IPS may forward the entity's request to the user's mobile device. In some embodiments, the IPS may construct a bitmap indicating the different items of PII being requested from the user. In some embodiments, the user's mobile device may construct this bitmap based on the items of PII that the user has permitted to release to the requesting entity.

At block 412, the user's mobile device may authenticate the entity submitting the request. In some embodiments, this can be done by verifying the entity identifier that was submitting with the request. For instance, the entity identifier may be a public key associated with the entity and the request may be digitally signed with the certificate authority's private key.

At block 414, the user may enter the requested PII into the application on their mobile device and the mobile device may send that PII to the IPS. In some embodiments, the mobile device may first encrypt the PII with the IPS public or a shared symmetric key as an extra layer of security.

At block 416, the IPS may receive the PII provided by the user and associate the PII with the user. In some embodiments, the data store associated with the IPS may be updated to reflect the items of PII (e.g., the attribute IDs or fields) collected from the user. For instance, if the user provided their address and social security number, the data store can be updated to indicate that the address and social security number for the user have been collected. This would allow all the available PII for a user to be determined based off the user identifier associated with the user.

At block 418, the IPS may marshal the received PII, bifurcate it, and convert it to instructions for executing a smart contract on the main blockchain (e.g., for embodiments in which a main blockchain is used in combination with an offchain). The IPS, as a third party middle-man, is not storing the data itself but rather providing the data along with instructions for its storage to the blockchain platform.

At block 420, the blockchain platform for the main blockchain will locate and execute the smart contract. In practical terms, smart contract will indicate the user and the different items of PII collected from the user. The PII will be indexed in the smart contract, but the actual values for the PII will be stored in the offchain. The smart contract will compute the locations of where the actual values for the PII are stored in the offchain.

At block 422, the values for the PII will be stored to the offchain for later retrieval. In some embodiments, the PII can be stored in an encrypted format in the offchain.

It should be noted that in FIG. 4, the user is only providing PII once they are prompted to do so. In some embodiments, the user will be unable to initiate, at-will, the process for providing PII to be stored. There may be multiple reasons for why this may be the case. First, it may be undesirable to provide the user access to the API used to store PII. Second, in order to create an access token, the entity's identifier (e.g., public key) is needed as an input. Users by themselves do not have knowledge of entity identifiers without receiving them, and thus will be unable to create the access token. Furthermore, it may be desirable to have the entity do a check to verify the PII provided by a user before that information is added to storage (e.g., the offchain) by the IPS. This verification could, for example, be performed by the entity prior to blocks 416 or 418. Examples of this verification may include a know-your-customer (KYC) process, which can include collecting and analyzing basic identity information from the user. This verification can be very desirable, since allowing a user to store PII at-will may result in unverified information being stored since there would be no entity assigned to verify the information.

Figure 5:
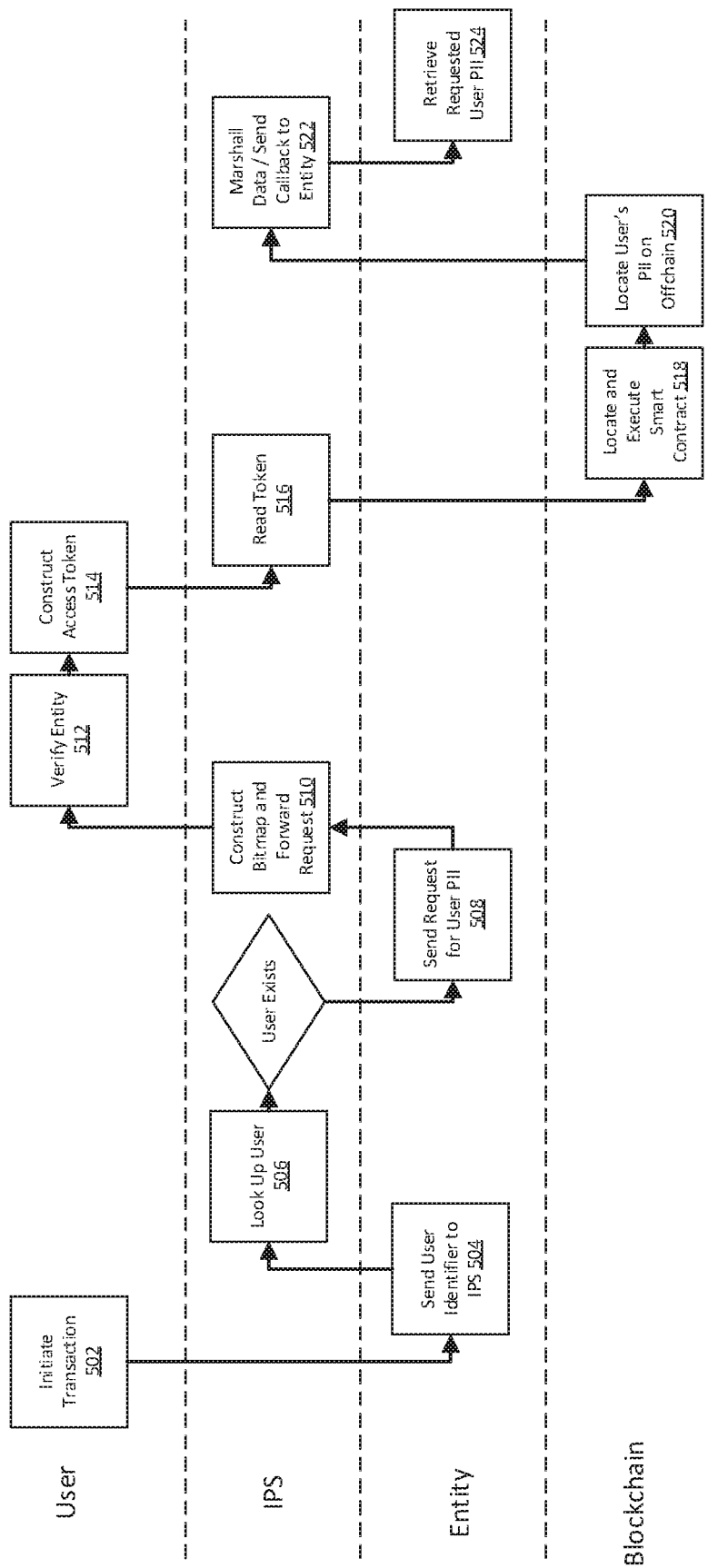
FIG. 5 illustrates a flowchart for releasing user PII with the identity and profiling system, in accordance with embodiments of the present disclosure.

FIG. 5 illustrates a flowchart for releasing user PII with the identity and profiling system, in accordance with embodiments of the present disclosure.

As shown in the figure, blocks 502, 504, 506, 508, 510, and 512 may be similar to blocks 402, 404, 406, 408, 410, and 412 in FIG. 4. However, FIG. 5 depicts a process in which an entity is retrieving user PII that has already been collected and stored.

At block 502, a user may initiate a transaction or interaction with an entity. In some embodiments, the user may do this via their mobile device, such as by directing a browser on their mobile device to a webpage of the entity and selecting an option on the webpage associated with the transaction. In some embodiments, the user may initiate the transaction in person. For example, if the entity is a bank, the user may be able to show up at a branch office of the bank to apply for a loan. In some embodiments, the user may initiate the transaction via a kiosk at the entity. For instance, the bank may have an automated kiosk that the user may use to apply for the loan.

At block 504, the entity may send a user identifier to the IPS. The user may supply their user identifier to the entity during the initiation of the transaction, or in some cases, the entity may know the user identifier in advance. In some embodiments, the user identifier may be a phone number of a mobile device associated with the user.

At block 506, the IPS may take the received user identifier and use it to look up whether the user's profile exists for the IPS. For instance, the IPS may have a data store (such as a state data store) that contains the user identifiers associated with users that have registered with the IPS. In some embodiments, the data store may also contain the names of the users that are associated with the corresponding user identifiers. For example, if the user identifiers are the phone numbers associated with registered users, then the data store would contain, for each registered user, their phone number and name. This data store would not contain any other user PII, which would be stored offchain and may be used primarily for user registration checks.

In some embodiments, this data store may also list the available attribute IDs or fields of a user's available PII without providing the actual values for that PII. For instance, the data store may indicate that the PII collected for user 'X' includes the user's address, social security number, and current salary without specifying what each of those items actually is. If the IPS determines that the user's profile exists (e.g., the user identifier is present in the system), the IPS may bypass the registration process shown in FIG. 3 and notify the entity.

At block 508, the entity may send a request for user PII to the IPS. The user PII requested may be specific to the transaction. For instance, if the user is applying for a loan with a financial entity, the financial entity may need to know certain information such as the user's bank account number to deposit the loan to, as well as the user's current salary and the user's total current debt in order to determine whether it is prudent to extend a loan to the user. The request may indicate the different items of information being requested for the user (these may be in the form of attribute IDs or field names, such as "salary", "total debt", and so forth). In some cases, the request may also include an entity identifier associated with the bank (e.g., the bank's public key). In some embodiments, the set of user PII being requested by the entity may be included in a 'first set of information' associated with the user.

At block 510, the IPS may forward the entity's request to the user's mobile device. In some embodiments, the IPS may construct a bitmap indicating the different items of PII being requested from the user. In some embodiments, i the user's mobile device may construct this bitmap based on the items of PII that the user has permitted to release to the requesting entity. The bitmap may represent a collection of bits, with each bit signifying or corresponding to an attribute of user data. If a bit is set to '1', then the attribute of the user's PII that corresponds to that bit is being requested. In some embodiments, the entity may actually construct the bitmap and send the bitmap along with the request to the IPS for user PII (e.g., at block 508). Thus, the request would include the bitmap and an entity identifier associated with the entity, such as the entity's public key. In turn, at block 510, the IPS may forward the bitmap and the entity's public key to the user's mobile device.

At block 512, the user's mobile device may authenticate the entity submitting the request. In some embodiments, this can be done by verifying the entity identifier that was submitting with the request. For instance, the entity identifier may be a public key certificate or public key associated with the entity and the request may be digitally signed with that public key, which can be verified with a certificate authority.

At block 514, the user may provide permission (e.g., via the mobile application) to release all, or part of, the PII requested by the entity. An access control bitmap may be generated (or the existing bitmap may be updated) to indicate which items of the user's PII are permitted to be released. This bitmap may be used to generate an access token in combination with the user's private key and the entity identifier (e.g., the entity's public key). As one example, the access token may include the bitmap and it can be encrypted using a shared secret that is generated based on a combination of the user's private key and the entity identifier (e.g., a combined hash of the user's private key and the entity identifier). At block 514, the access token may be constructed and sent to the IPS. In some embodiments, the bitmap is "bound" with the user's key and the entity's key. Additionally, encryption can be used by the mobile device to create the access token. In some embodiments, the set of user PII that the user is permitting to release to the requesting entity may be included in a 'second set of information' associated with the user.

At block 516, the IPS may receive and decode the access token. The access token can be decoded based on the appropriate decryption method for the implementation. For example, in some embodiments, the access token may have been generated by the user's mobile device using a shared secret (e.g., a symmetric key) that is based off of the user's private key and the entity's public key. For instance, to form a shared secret, the entity's public key could be signed by the user's private key (or a hash of the user's private key), or both the entity's public key and the user's private key can be hashed, and so forth. Thus, the shared secret may be known to both the IPS and the user's mobile device, and the IPS may decrypt the access token using the shared secret. In some embodiments, the IPS also may be capable of generating the shared secret. For instance, the IPS may be able to derive the shared secret using the entity's public key without having the user's private key. If the shared secret involved signing or modifying the entity's public key using a hash of the user's private key, then the IPS may be able to generate the shared secret from the entity's public key and the hash of the user's private key without the IPS actually knowing the user's private key.

In some embodiments, the shared secret may be exchanged between the IPS and the user's mobile device using a Diffie-Hellman exchange scheme.

Alternatively, as another approach, the IPS may have provided the user's mobile device with just the IPS public key (e.g., during the registration process). The IPS may retain an IPS private key, which the IPS can use to decrypt the access token that has been encrypted by the user mobile device using the IPS public key. Afterwards, the IPS can use the bitmap associated with the access token to determine which items of the user's PII are permitted to be released. The IPS can further use the access token to determine the location of the smart contract on the main blockchain that is associated with the user's PII.

At block 518, the IPS will instruct the blockchain platform to locate and execute the smart contract on the main blockchain in order to obtain the locations of the user's PII stored in the offchain. In general, the smart contracts on the blockchain platform may have a transaction identifier or an address that can be used to locate that smart contract. Thus, a smart contract corresponding to a particular user could be located using the address. For example, the access token could be parsed and a checksum could be calculated (e.g., to confirm the access token is legitimate). The checksum may point to a specific transaction identifier or address that can be used to look up the smart contract corresponding to the user associated with that access token. In this example, there may be a hash table that stores various checksums and the corresponding transaction identifier as key-value pairs. Alternatively, as another example, the checksum calculation may result in the transaction identifier itself, such that the checksum provides the location of the smart contract itself. In such an example, there would be no need to store the relationship between the checksum and the transaction identifier used to locate the smart contract, thereby eliminating a potential weak link in the case that the IPS is hacked. Once the smart contract for a user is located (e.g., using the transaction identifier), the smart contract can be executed (e.g., by providing the access token, if it is required by the smart contract's logic) and it will return the location of that user's PII stored in the offchain.

At block 520, the items of the user's PII permitted to be released are retrieved from the offchain by the IPS using the determined locations for the PII. In some embodiments, the values for the user PII retrieved from the offchain may be included in a 'third set of information' associated with the user.

At block 522, the IPS collects the data items of the user's PII permitted to be released that were retrieved from the offchain. The IPS sends a callback (e.g., an API call) to the entity in order to release the data items to the entity. This lets the entity know that the IPS has the information requested and access to that information can be obtained by the entity for a certain time period.

At block 524, the entity can go ahead and retrieve the user's PII that was requested. In some embodiments, the entity may pull the user's PII from the IPS. In some embodiments, the IPS may provide the entity access to the user's PII for a limited amount of time. This time can be specified in the smart contract, or it can be specified by the user (e.g., when the user provides permission to release their PII, resulting in the transmission of the access token), In the latter case, the IPS (rather than the smart contract) could keep track of the time window that the entity would have access to the user's PII. In either case, the IPS may deny the entity access to the information once the time window that the entity is permitted to have access to the user's PII expires.

Specific details regarding some of the above-described aspects are provided above. The specific details of the specific aspects may be combined in any suitable manner without departing from the spirit and scope of embodiments of the invention.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by an identity and profiling system, a request from an entity computing system for a first set of information associated with a user;
sending, by the identity and profiling system, a request to a mobile device operated by the user for the first set of information associated with the user;
receiving, by the identity and profiling system, an access token from the mobile device;
determining, by the identity and profiling system, a key associated with the user;
decrypting, by the identity and profiling system, the access token using the key in order to obtain a second set of information associated with the user;
determining from a main blockchain, by the identity and profiling system, at least one storage location for a third set of information associated with the user;
locating, by the identity and profiling system, the third set of information associated with the user in an offchain based on the at least one storage location; and
sending, by the identity and profiling system, the third set of information associated with the user to the entity computing system,
wherein the method further comprises:
determining, by the identity and profiling system, that a phone number for the mobile device associated with the user does not exist within the identity and profiling system;
upon determining that the phone number for the mobile device associated with the user does not exist within the identity and profiling system, sending, by the identity and profiling system, a request to the mobile device for the user to provide the first set of information associated with the user;
assigning, by the identity and profiling system, the key associated with the user to the mobile device;
receiving, by the identity and profiling system, the first set of information associated with the user from the mobile device; and
storing, by the identity and profiling system, the first set of information associated with the user in the offchain, wherein at least one storage location for the first set of information associated with the user is stored in the main blockchain.

2. The method of claim 1, wherein the offchain is a decentralized data store.

3. The method of claim 1, wherein the offchain is an alternate blockchain.

4. The method of claim 1, wherein the at least one storage location for the third set of information associated with the user is indicated in a smart contract of the main blockchain.

5. A computing system comprising:
a state data store;
a processor;
a computer-readable memory containing program instructions that, when executed by the processor, cause the processor to:
receive a request from an entity computing system for a first set of information associated with a user, wherein the entity computing system is associated with an entity identifier;
send a request to a mobile device operated by the user for the first set of information associated with the user;

receive an access token from the mobile device;
determine a key associated with the user;
decrypt the access token using the key in order to obtain a second set of information associated with the user;
determine, from a main blockchain, at least one storage location for a third set of information associated with the user;
locate the third set of information associated with the user in an offchain based on the at least one storage location; and
send the third set of information associated with the user to the entity computing system,
wherein the program instructions, when executed by the processor, further cause the processor to:
determine that a phone number for the mobile device associated with the user does not exist within the state data store;
upon determining that the phone number for the mobile device associated with the user does not exist within the state data store, send a request to the mobile device for the user to provide the first set of information associated with the user;
assign the key associated with the user to the mobile device;
receive the first set of information associated with the user from the mobile device; and
store the first set of information associated with the user in the offchain, wherein at least one storage location for the first set of information associated with the user is stored in the main blockchain.

6. The computing system of claim 5, wherein the offchain is a decentralized data store.

7. The computing system of claim 5, wherein the offchain is an alternate blockchain.

8. The computing system of claim 5, wherein the at least one storage location for the third set of information associated with the user is indicated in a smart contract of the main blockchain.

9. A non-transitory computer-readable memory containing program instructions that, when executed by a processor, cause the processor to:
receive a request from an entity computing system for a first set of information associated with a user, wherein the entity computing system is associated with an entity identifier;
send a request to a mobile device operated by the user for the first set of information associated with the user;
receive an access token from the mobile device;
determine a key associated with the user;
decrypt the access token using the key in order to obtain a second set of information associated with the user;
determine, from a main blockchain, at least one storage location for a third set of information associated with the user;
locate the third set of information associated with the user in an offchain based on the at least one storage location; and
send the third set of information associated with the user to the entity computing system,
wherein the program instructions, when executed by the processor, further cause the processor to:
determine that a phone number for the mobile device associated with the user does not exist within a state data store;
upon determining that the phone number for the mobile device associated with the user does not exist within the state data store, send a request to the mobile device for the user to provide the first set of information associated with the user;
assign the key associated with the user to the mobile device;
receive the first set of information associated with the user from the mobile device; and
store the first set of information associated with the user in the offchain, wherein at least one storage location for the first set of information associated with the user is stored in the main blockchain.

10. The non-transitory computer-readable memory of claim 9, wherein the offchain is a decentralized data store.

11. The non-transitory computer-readable memory of claim 9, wherein the offchain is an alternate blockchain.

12. The non-transitory computer-readable memory of claim 9, wherein the at least one storage location for the third set of information associated with the user is indicated in a smart contract of the main blockchain.

13. A non-transitory computer-readable memory containing program instructions that, when executed by a processor, cause the processor to:
receive a request from an entity computing system for a first set of information associated with a user, wherein the entity computing system is associated with an entity identifier;
send a request to a mobile device operated by the user for the first set of information associated with the user;
receive an access token from the mobile device;
determine a key associated with the user;
decrypt the access token using the key in order to obtain a second set of information associated with the user;
determine, from a main blockchain, at least one storage location for a third set of information associated with the user;
locate the third set of information associated with the user in an offchain based on the at least one storage location; and
send the third set of information associated with the user to the entity computing system, wherein the access token is an access control bitmap.

14. The non-transitory computer-readable memory of claim 9, wherein the first set of information associated with the user includes PII information of the user.

15. The method of claim 1, wherein the first set of information comprises a set of information of the user desired by the entity.

16. The method of claim 15, wherein the second set of information comprises a set of personal identifiable information that the user is allowing to be released.

17. The method of claim 16, wherein the third set of information comprises a subset of the set of information in the first set of information.

* * * * *